United States Patent [19]

Baumgarten et al.

[11] Patent Number: 4,790,639
[45] Date of Patent: Dec. 13, 1988

[54] ROTARY MIRROR FOR OPTICAL SYSTEMS

[75] Inventors: Klaus Baumgarten, Eglharting; Kurt Hummel, Munich, both of Fed. Rep. of Germany

[73] Assignee: Messerschmitt-Boelkow-Blohm Gesellschaft mit Beschraenkter Haftung, Munich, Fed. Rep. of Germany

[21] Appl. No.: 73,994

[22] Filed: Jul. 16, 1987

[30] Foreign Application Priority Data

Jul. 29, 1986 [DE] Fed. Rep. of Germany ....... 3625642

[51] Int. Cl.$^4$ .............................................. G02B 26/10
[52] U.S. Cl. ..................................... 350/486; 350/6.9; 350/6.91; 350/487
[58] Field of Search ................ 350/6.6, 486, 487, 6.9, 350/6.91; 52/602

[56] References Cited

U.S. PATENT DOCUMENTS

| | | | |
|---|---|---|---|
| 3,596,863 | 8/1971 | Kaspareck | 350/486 |
| 3,642,344 | 2/1972 | Corker | 350/486 |
| 3,942,879 | 3/1976 | Pledger | 350/486 |
| 3,957,356 | 5/1976 | Pledger | 350/486 |
| 3,998,530 | 12/1976 | Kaschak | 350/486 |
| 4,048,730 | 9/1977 | Edwards | 350/486 |
| 4,125,979 | 11/1978 | McLaughlin | 62/602 |
| 4,211,043 | 7/1980 | Coday | 52/602 |
| 4,244,901 | 1/1981 | Wencley et al. | 52/602 |
| 4,317,611 | 3/1982 | Petersen | 350/486 |
| 4,576,449 | 3/1986 | Roger | 350/487 |

Primary Examiner—John K. Corbin
Assistant Examiner—Martin Lerner
Attorney, Agent, or Firm—W. G. Fasse; D. H. Kane, Jr.

[57] ABSTRACT

A rotary mirror for an optical system has a mirror section with first and second edges and a bearing connecting to each edge. A reinforcing rib and a slot extend alongside at least the first and second edges, and preferably at a right angle to a rotational axis of the two bearings. Each rib may extend on one or the other side of the respective slot or the slot may extend within the respective reinforcing rib. In all embodiments the slot rib combination decouples the mirror section from any misalignment of the bearings to prevent introducing distortions into the mirror section.

9 Claims, 1 Drawing Sheet

ROTARY MIRROR FOR OPTICAL SYSTEMS

FIELD OF THE INVENTION

The invention relates to a rotary mirror for optical systems. More specifically, the rotary mirror is supported by dual bearings, one of which is mounted to one journal pin and the other is mounted to another journal pin at opposite edges of the mirror.

DESCRIPTION OF THE PRIOR ART

Mirrors mounted for rotation or tilting as described above are known in the art, for example in the form of sighting mirrors for sighting devices or as mirrors which oscillate back and forth for image scanning, for example in a heat image camera. Such mirrors are frequently subject to large angular accelerations about their rotational axes.

In connection with rapid rotational movements it is desirable to accelerate masses which are as small as possible. Therefore, these rotary mirrors are constructed as so-called lightweight structures using extremely thin mirror sections. Where such a mirror is connected with an electrical motor for rotating or tilting the mirror, one journal pin of the mirror is connected to a motor shaft which itself is supported for rotation by dual bearings. Additionally, the mirror has a further bearing so that the total number of bearings makes the system, specifically the mirror rotational mounting, an over determined or redundant system. Further, there are no absolutely aligned bearing axles available in practice. Therefore, it is quite easy that distorting stress is applied to the thin mirror section. Such distorting stress can cause inaccuracies in the respective optical system. In those instances in which the second journal pin is also connected to an apparatus which itself is supported by dual bearings, a further redundancy is introduced, for example, by a potentiometer for measuring the instantaneous mirror position. Thus, a double redundancy of the bearing system is involved, whereby both journal pins can introduce distorting stresses into the thin mirror section.

OBJECTS OF THE INVENTION

In view of the foregoing it is the aim of the invention to achieve the following objects singly or in combination:

to construct a rotatable mirror of the type mentioned above in such a way that any inaccuracies inherent in the bearing mountings are prevented from introducing distorting stresses into the thin mirror section;

to effectively decouple the thin mirror section from its rotational bearing mountings while still providing a satisfactory mechanical connection between the thin mirror section and its dual bearings; and to reinforce the thin mirror section.

SUMMARY OF THE INVENTION

According to the invention the above objectives have been achieved in a mirror construction characterized in that the thin mirror section is provided with a slot extending along each edge which is connected to the respective journal pin and in that a narrow rib is provided alongside the slot. Preferably the rib is located between the slot and the respective journal pin. Where the mirror is rectangular, the slot and narrow rib extend perpendicularly to the rotational axis of the mirror. In a mirror with a curved edge the slots and ribs may be sickle shaped.

The above mentioned slots decouple the thin mirror section from forces or moments introduced into the journal pins so that any effects of these forces are introduced into the ribs remaining between the slot and the bearing stud or between the slot and the mirror section proper. These ribs preferably have a dimension perpendicularly to the plane defined by the mirror section which corresponds to several times the thickness of the thin mirror section, whereby the ribs function as leaf springs which transmit moments around the longitudinal rotational axis of the mirror in a completely stiff manner. However, forces and moments in any other direction, for example forces caused by alignment errors between the several journal studs or by a parallel displacements in the bearings of the devices to which the mirror is connected such as motors, potentiometers or the like, are taken up by elastical deformations of the leaf spring type ribs, whereby these deformations compensate for such forces and moments which otherwise would introduce undesirable stresses and deformations into the thin mirror section. The most important advantage of this construction according to the invention is seen in that in practice it is now possible to make the mirror section of sheet metal and to have only a thickness of about 0.5 mm to thereby achieve an optimally low moment of inertia.

Additionally, the ribs function as reinforcements along the edges next to the journal pins. Further ribs may be placed along the edges of the mirror away from the journal pins or shafts. These further ribs also function as reinforcements. The ribs along the edges along the journal pins may be located either between the slot and the respective journal pin or the slots may be machined directly into the reinforcing ribs, or the ribs may be located between the mirror section and the respective slot.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
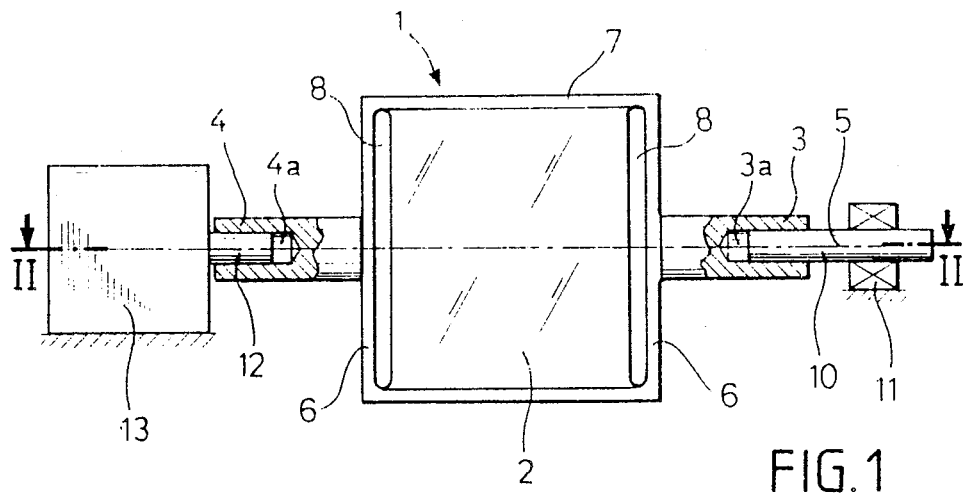
FIG. 1 is a top view partially in section onto a mirror system according to the invention with the decoupling slots arranged in the mirror section.
Figure 2:
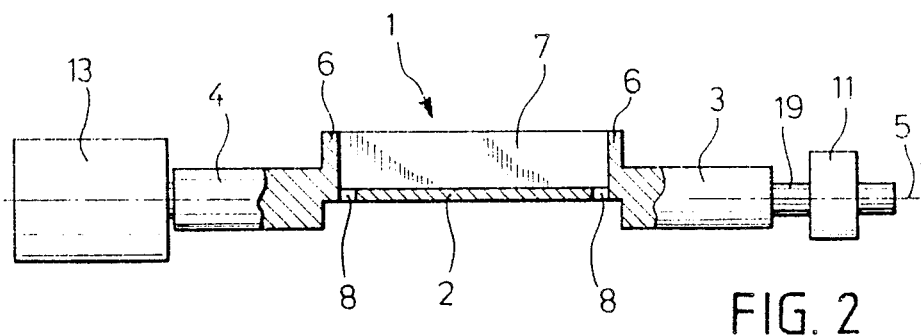
FIG. 2 is a side view partially in section along the section line II—II in FIG. 1.

The mirror system 1 shown in FIGS. 1 and 2 has a thin mirror section 2 which has an approximately rectangular or square configuration for example. The right-hand vertical edge of the mirror 2 is connected to a journal pin 3 having a bore 3a for receiving a bearing shaft 10 rotatably mounted in a bearing 11 having a rotational axis 5. The left-hand edge of the mirror section 2 is connected to a journal shaft 4 having a bore 4a connected to a drive shaft 12 of a motor 13, for example an electromotor. The motor shaft 12 is rigidly secured to the journal shaft 4, for example by a set screw not shown. Ideally, the rotational axis of the shaft 12 and of the shaft 10 should be aligned with each other. However, in practice such complete alignment is not possible, whereby distortions may be introduced into the mirror section 2 which is to be avoided according to the invention. This purpose is accomplished by reinforcing ribs 6 and 7 extending along the respective sides or rims or edges of the mirror section 2 next to the corresponding journal pins or shafts 3, 4 and perpendicularly thereto, and by the slots 8 extending in parallel to the reinforcing ribs 6 and perpendicularly to the rotational axis 5 passing, as is known, through the surface of the mirror section 2. Forces and moments resulting from alignment errors or from any parallel offset of the motor shaft 12 supported by double bearings relative to the axis 5 are taken up or compensated by the reinforcing ribs 6 acting as stiff leaf springs. As best in FIG. 2, the thin mirror section 2 having a given thickness of only about 0.5 mm as disclosed above, is surrounded by a box frame formed by the ribs 6 and 7. Each rib 6, 7 has, perpendicularly to the plane defined by the mirror section 2, a vertical height corresponding to several times said given thickness of the mirror section 2. This configuration of the ribs results in a stiff, shape retaining box frame.

Figure 3:
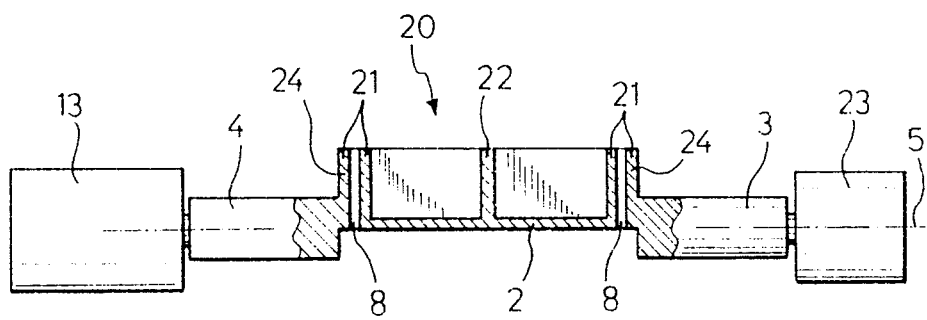
FIG. 3 is a view similar to that of FIG. 2, but showing a modified version with the decoupling slots machined into the reinforcing ribs.

FIG. 3 shows an embodiment similar to that of FIG. 2, with a mirror system 20 having a thin mirror section 2 provided with wider edge reinforcing ribs 21 into which the slots 8 are machined, for example, by a milling operation. A central reinforcing rib 22 is also provided as shown in FIG. 3 The rib 22 may be connected as at its ends to the further edge reinforcing ribs 7 shown in FIGS. 1 and 2.

In FIG. 3 the journal pin 3 is connected to a potentiometer 23 for measuring the instantaneous mirror position. The potentiometer 23 is also supported by two bearings not shown. The outer rib portion 24 of the edge reinforcing rib 21 also functions as a leaf spring for taking up or compensating undesired forces and moments which may be generated by the motors 13 and/or by the potentiometer 23.

Although the invention has been described with reference to specific example embodiments, it will be appreciated that it is intended to cover all modifications and equivalents within the scope of the appended claims.

What we claim is:

1. A rotary mirror device for an optical system, comprising mirror means for reflecting radiation, said mirror means including a thin mirror section having a given small thickness and ribs forming a shape retaining stiff box frame around said mirror section, said ribs having, perpendicularly to said mirror section, a height corresponding to several times said given thickness to form box frame sides, first rotation bearing means connected to said stiff box frame at one side of said stiff box frame, second rotation bearing means connected to an opposite side of said stiff box frame, said first and second rotation bearing means defining a common rotational axis, first and second slots in said mirror section, said slots extending alongside a first pair of opposite stiff box frame sides and symmetrically relative to said common rotational axis, said slots having a length corresponding substantially to a distance between two further box frame sides forming a second pair of box frame sides.

2. The rotary mirror device of claim 1, wherein each of said first and second rotation bearing means further comprises a bearing shaft, at least one of said bearing shafts being connected to a further device which itself has at least two bearings.

3. The rotary mirror device of claim 1, wherein said first and second slots are machined into said mirror section.

4. The rotary mirror device of claim 1, wherein said ribs comprise a first double rib extending along said one side of said stiff box frame and a second double rib extending along said opposite side of said stiff box frame, said first slot extending through said first double rib, said second slot extending through said second double rib.

5. The rotary mirror device of claim 1, further comprising at least one central reinforcing rib (22).

6. The rotary mirror device of claim 1, wherein said mirror section has a rectangular configuration.

7. The rotary mirror device of claim 1, wherein said common rotational axis extends in said mirror section.

8. The rotary mirror device of claim 1, wherein said first and second slots extend at a right angle relative to said rotational axis.

9. The rotary device of claim 1, wherein said first and second slots extend in parallel to the neighboring box frame sides.

* * * * *